(12) United States Patent
Rajaraman

(10) Patent No.: US 6,500,896 B1
(45) Date of Patent: Dec. 31, 2002

(54) METHOD AND COLORANT FOR THE COLORING OF RUBBER

(75) Inventor: Hariharan Rajaraman, Munroe Falls, OH (US)

(73) Assignee: Chromascape, Inc., Independence, OH (US)

( * ) Notice: Subject to any disclaimer, the term of this patent is extended or adjusted under 35 U.S.C. 154(b) by 0 days.

(21) Appl. No.: 09/503,696

(22) Filed: Feb. 14, 2000

(51) Int. Cl.[7] .................................................. C08K 3/00
(52) U.S. Cl. ....................................... 524/552; 524/497
(58) Field of Search ................................. 524/552, 497

(56) References Cited

U.S. PATENT DOCUMENTS

| | | |
|---|---|---|
| 4,112,176 A | 9/1978 | Bailey |
| 4,420,346 A * | 12/1983 | Mohr et al. ............. 106/288 B |
| 4,668,728 A | 5/1987 | Botzman |
| 4,987,192 A | 1/1991 | Oberster et al. |

* cited by examiner

*Primary Examiner*—Edward J. Cain
(74) *Attorney, Agent, or Firm*—McDonald, Hopkins, Burke & Haber Co., LPA

(57) ABSTRACT

The present invention provides a method for coloring a rubber substrate with a latex-based colorant comprising the steps of providing a latex-based colorant that includes an elastomeric latex-based binder and a pigment system and mixing the latex-based colorant with the rubber substrate. Optionally, the latex-based colorant further comprises a surfactant system, a thickener, a defoamer, and an antioxidant. The present invention further provides a colored rubber and a latex-based colorant for coloring rubber.

4 Claims, No Drawings

METHOD AND COLORANT FOR THE COLORING OF RUBBER

FIELD OF THE INVENTION

This invention relates to a method used in the coloring of rubber. This invention further relates to a colorant used to color rubber and colorized rubber.

BACKGROUND OF THE INVENTION

Crumb rubber, commonly manufactured from recycled tires, is used in road paving, horse tracks, floor mats, bedding for farm animals, shingles for roofing and sports turf surfaces (such as football fields, tracks, etc.) to add resilience to the surfaces and to absorb impact better than asphalt or turf. Crumb rubber is also gaining popularity as playground cover for areas where children climb or face dangers from falling. Its superior ability to cushion impacts makes it a very desirable ground surface for high-impact activities.

The use of crumb rubber has been limited due to the lack of aesthetic appeal in that most tires are black. Some methods of coloring crumb rubber have been developed, such as wetting and drying material or painting over the black, but these methods are not efficient, practical or durable. Painting over the rubber consumes a large amount of paint and commonly results in a non-durable product as the paint is rubbed off when in consistent contact with another object. Spraying the crumb rubber and allowing it to air dry also creates a wide variety of problems. The spray method produces a product with poor color uniformity and incomplete coverage. Sprayed on paints tend to demonstrate poor adhesion of the colorants to the rubber. In addition, the spray method wastes an excessive amount of paint and create problems with waste disposal when a solvent-based paint is used. Traditional methods also lack the ability to achieve vibrant colors due to the carbon black that is present in the rubber. The carbon black darkens or dirties the colorant thereby producing a color that lacks vibrancy. It would be desirable to have a method of coloring rubber which will produce a durable, vibrant product.

SUMMARY OF THE INVENTION

The present invention provides a method for coloring a rubber substrate with a latex-based colorant comprising the steps of providing a latex-based colorant that includes an elastomeric latex-based binder and a pigment system and mixing the latex-based colorant with the rubber substrate. Optionally, the latex-based colorant further comprises a surfactant system, a thickener, a defoamer, and an antioxidant. The present invention further provides a colored rubber and a latex-based colorant for coloring rubber.

DETAILED DESCRIPTION OF THE INVENTION

The present invention pertains to a colored rubber substrate, a method of coloring a rubber substrate, and a latex-based colorant for such a coloring method. The steps involved in the method include, providing the colorant, and applying the colorant to the rubber substrate. The method may further comprise the step of vulcanizing the rubber.

The latex-based colorant comprises a latex-based binder and a pigment system. The latex-based colorant preferably comprises 5–50 percent by weight elastomeric latex-based binder, 10–70 percent by weight the pigment system, and 0–85 percent by weight water. It is more preferred for the latex-based colorant to comprise 10–20 percent by weight elastomeric latex-based binder, 30–55 percent by weight the pigment system, and 25–60 percent by weight water. The latex-based binder comprises an elastomeric latex, either natural or synthetic, that forms lattices, or colloidal dispersions of polymeric material, in a water-based system. When lattices are applied on a substrate, a uniform coating of the rubber-results after the water evaporates. The elastomeric latex preferably has a solids content in the range of 25–75 percent, and it is more preferred to have an elastomeric latex with a solids content in the range of 45–65 percent. Examples of synthetic elastomeric latex are styrene butadiene rubber, nitrile rubber, butyl rubber, polychloroprene rubber, and ethylene-propylene rubber. It is preferred to use an elastomeric latex comprising a mixture of natural rubber and styrene butadiene rubber.

In addition, the latex-based colorant includes a pigment system. The pigment system comprises an opacifer and an organic pigment dispersion, preferably between a 3:1 and 2:1 ratio, respectively. Examples of suitable opacifers are zinc oxide, zinc sulfate, and barium sulfate. The preferred opacifer has a refractive index greater than 2. Such an opacifer would include titanium oxide, and more preferably a rutile grade of titanium dioxide. The opacifer provides the opacity to cover up the carbon black on the rubber and the color is achieved by using a suitable organic pigment dispersion. Use of a latex-based colorant permits application of a wide variety of colors to the rubber substrate. Examples of suitable organic pigment dispersions are phthalocyanine blues and greens, DNA orange, Diarylide yellows, Naphthol red, Lithol Rubine red, Toluidine red, Red Lake C, Carbazole violet, Barium Lithol red, Rhodamine Red, Methyl violet, and Quinacridone Magenta. Organic pigment dispersions that are water-based are preferred because they are compatible with the elastomeric latex-based binders.

Optionally, the colorant further comprises a defoamer, a surfactant system, a thickener, and an antioxidant. Any conventional defoamer that minimizes the formation of foam and bubbles during the manufacture of water-based dispersions may be employed. It is preferred to use a mixture of hydrophobic solids and polysiloxanes in polyglycol as the defoamer. One suitable example is BYK022, manufactured by BYK-Chemie USA.

The surfactant system is preferably a blend of non-ionic and ionic surfactants. Examples of non-ionic surfactants are condensation products of fatty alcohols with ethylene oxide, polyethylene glycol esters or chain fatty acids, or sobitan esters. Ionic surfactants can be either anionic or certain cationic compounds. Suitable anionic surfactants are, for example, sodium alkyl sulfate, sodium salt of polymeric polycarboxylic acid, sodium polymethacrylate, and sodium alkyl sulfate. Suitable cationic surfactants are, for example, salts of primary, secondary, or tertiary amines and quartenary salts such as cetylpyridinium bromide, hexa-decyl-ethyl morpholinium chloride and diethyl didodecyl ammonium chloride. The preferred surfactant system is a blend of sodium salt of polymeric polycarboxylic acid and a non-ionic surfactant based on modified alkylaryl polyther, preferably with an 80:20 blend, respectively.

The thickener is desired to provide an increased shelf-life and to impart a viscosity between 75 and 95 KU for the latex-based colorant. A thickener with a viscosity between 75 and 100 KU, as measured by a Stormer Viscometer, is preferred, and more preferably is between 80 and 90 KU. Suitable thickeners are gums, starches, cellulose polymers, minerals, or alginates. The preferred thickener is a hydrated aluminum magnesium silicate, commonly designated as Attagel, commercially available from Engelhard Corporation, or Min-U-Gel, comniercially available from Floridin Industries.

An antioxidant is optionally added to protect the latex film from degradation due to heat and ultraviolet light. Suitable antioxidants are, for example, N-N'Di(2-octyl)-p-phenylene diamine, diphenyl-p-phenylendedianmine, octylated diphenulamine, dioctylated diphenylarnine, styrenated phenol, or hindered phenol. The preferred antioxidant is a water based dispersion of octylated diphenylamine, commonly designated under the trade names Agerite Stalite and C-560 dispersion, commercially available from R.T. Vanderbilt Company.

The latex-based colorant is prepared by placing the components into a mixer, preferably a Cowles type mixer, and.thoroughly mixing. The mixing wets the pigments with the surfactants and ensures that all the ingredients are uniformly incorporated.

The latex-based colorant is applied to a rubber substrate to be colored, such as, for example, crumb rubber, natural rubber, ethylene-propylene rubber, butyl rubber, nitrile rubber, styrene-butadiene rubber, or polychloroprene rubber for example. The colorant and the rubber to be colored are thoroughly mixed in, for example, a paint shaker, drum tumbler, ribbon or paddle type blender, or a double cone blender. Good results have been obtained by mixing with a standard a paint shaker for at least 1.5 minutes.

Optionally, the rubber is vulcanized during the mixing process to reduce tackiness, increase tensile strength, decrease solubility in solvents, increase elasticity, and decrease temperature sensitivity. To accomplish the vulcanization of the rubber, a vulcanizing agent, a cure activator, and accelerator are added before mixing. The vulcanizing agent is typically a colloidal sulfur, preferably as a water based dispersion. The cure activator, which increases the rate of vulcanization and improves tensile strength, is typically a zinc oxide, preferably as a water based dispersion. Examples of the accelerator are thiuram, dithiocarbonate, xanthate, mercapto thiazole, mercapto sulfonamide, thiourea, and guanidine. Dithiocarbonate in a water based dispersion is the preferred accelerator.

The following are examples employing this method of coloring crumb rubber.

EXAMPLE 1

Blue colored crumb rubber was produced by mixing 200 grams of crumb rubber and 4 grams of latex-based colorant and 0.15 grams of vulanizing agent in a paint shaker for 2 minutes. The latex-based colorant had the following formulation and was made by mixing on a Cowles type mixer at a blade tip speed of 150 feet per minute for 10 minutes.
Latex-Based Colorant:

| MATERIAL | Percentage by Weight |
|---|---|
| Water | 40.20% |
| BYK022 polysiloxane defoamer | 0.40% |
| Triton CF 10 alkyl aryl ether surfactant | 0.40% |
| Tamol 731A anionic dispersant | 2.00% |
| Tioxide TR-92 rutile titanium dioxide (opacifer) | 30.00% |
| Alper DB15C-888 Phthalo Blue dispersion (organic pigment dispersion) | 10.00% |
| Dynatex GTZ natural rubber latex 62% solid | 7.50% |
| DL 313 NA modified SBR latex 48% solid | 7.50% |
| Min-U-Gel 400 thickener | 2.00% |

Vulcanizing Agents:

| MATERIAL | Percentage by Weight |
|---|---|
| Water | 62.50% |
| 50% sulfur dispersion | 6.25% |
| 60% zinc dispersion | 18.75% |
| Butyl Zimate Slurry | 6.25% |
| C-560 dispersion | 6.25% |

The resulting product was aged at room temperature for a period of between 7 and 14 days, and was examined for color, colorfastness in water, and colorfastness to mild friction and contact. The crumb rubber was observed to have a bright blue color and no carbon black showed through the blue. Colorfastness in water is tested by immersing the crumb rubber in water at room temperature for a period of 21 days and then the water is subsequently checked for discoloration due to bleeding of pigment from the crumb rubber. Colorfastness to mild friction is tested by rubbing the crumb rubber with the tester's hands and the hands are subsequently checked for discoloration due to bleeding of pigment from the crumb rubber. The adhesion of colorants to the crumb rubber was very good as no significant bleeding of the pigment occurred.

EXAMPLE 2

A green latex-based colorant was made, as. in Example 1, by replacing the Phthalo blue dispersion in the latex-based colorant with a Phthalo Green dispersion DG007-448, from Alper dispersions. A green colored crumb rubber was produced by mixing 200 grams of crumb rubber, 4 grams of green latex-based colorant and 0.15 grams of vulcanizing agents, as in Example 1, in a paint shaker for two minutes. The crumb rubber thus produced was bright green in color and had the required colorfast properties.

EXAMPLE 3

A violet latex-based colorant was produced, as in Example 1 using the following formulation:
Latex-Based Colorant:

| MATERIAL | Percentage by Weight |
|---|---|
| Water | 35.20% |
| BYK022 polysiloxane defoamer | 0.40% |
| Triton CF 10 alkyl aryl ether surfactant | 0.40% |
| Tamol 731A anionic dispersant | 2.00% |
| Tioxide TR-92 rutile titanium dioxide | 30.00% |
| Creanova Carbazole violet dispersion 877-8895 | 15.00% |
| Dynatex GTZ natural rubber latex 62% solid | 7.50% |
| DL 313 NA modified SBR latex 48% solid | 7.50% |
| Min-U-Gel 400 thickener | 2.00% |

Two hundred grams of crumb rubber was mixed with 6 grams of the latex-based colorant and 0.15 grams of the vulcanizing agents, as in Example 1. The colorized crumb rubber produced was a bright violet with good colorfast properties.

Using similar methods to those employed in examples 1–3, crumb rubber can be colored to obtain different hues such as yellow, orange, red, and an infinite number of other shades by using suitable organic pigment dispersions, or mixtures thereof, to obtain the desired hues.

Although illustrative embodiments of the present invention have been described herein, it is to be understood that the invention is not limited to those precise embodiments, and that various other changes and modifications may be effected therein by one skilled in the art without departing from the scope or spirit of the present invention.

What is claimed is:

1. A latex-based colorant for coloring a rubber substrate comprising a latex binder and a pigment system;

said latex binder comprising an elastomeric latex having a solids content between 25–75% and selected from the group consisting of natural rubber, synthetic rubber, or a mixture thereof, said elastomeric latex forming lattices, or colloidal dispersions of polymeric material, in a water-based system; and said pigment comprising titanium oxide and an organic pigment dispersion.

2. The latex-based colorant of claim 1 wherein said synthetic rubber is selected from the group consisting of styrene butadiene rubber, nitrile rubber, butyl rubber, polychloroprene rubber, and ethylene-propylene rubber.

3. The latex-based colorant of claim 1 wherein said water-based colorant further comprises a surfactant system, a defoamer, an antioxidant, and a thickener.

4. A latex-based colorant for coloring a rubber substrate comprising a latex binder and a pigment system;

said latex binder comprising an elastomeric latex having a solids content between 25–75% and selected from the group consisting of natural rubber, synthetic rubber, or a mixture thereof, said elastomeric latex forming lattices, or colloidal dispersions of polymeric material, in a water-based system; and said water based system comprising a defoamer, an antioxidant, a thickener, and a surfactant system, said surfactant system selected from the group consisting of non-ionic, anionic, and cationic surfactants, and mixtures thereof; said defoamer is a mixture of hydrophobic solids and polysiloxanes; said antioxidant is selected from the group consisting of N-N'Di(2-octyl)-p-phenylene diamine, diphenyl-p-phenylendedeiamine, octylated diphenulamine, dioctylated diphenylamine, styrenated phenol, hindered phenol, and mixtures thereof; and said thickener is selected from the group consisting of a gum, starch, cellulose polymer, mineral, alginate, and mixtures thereof.

* * * * *